United States Patent
Lee et al.

(10) Patent No.: US 7,483,490 B2
(45) Date of Patent: *Jan. 27, 2009

(54) METHOD FOR TRANSMITTING WIDEBAND SIGNALS VIA A COMMUNICATION SYSTEM ADAPTED FOR NARROW-BAND SIGNAL TRANSMISSION

(75) Inventors: Lin-Nan Lee, Potomac, MD (US); Khalid Karimullah, Olney, MD (US); Feng-Wen Sun, Germantown, MD (US); Kamran Etemad, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1082 days.

This patent is subject to a terminal disclaimer.

(21) Appl. No.: 10/346,883

(22) Filed: Jan. 17, 2003

(65) Prior Publication Data
US 2003/0108089 A1    Jun. 12, 2003

Related U.S. Application Data

(62) Division of application No. 09/104,467, filed on Jun. 25, 1998, now Pat. No. 6,539,050.

(60) Provisional application No. 60/050,884, filed on Jun. 26, 1997, provisional application No. 60/052,574, filed on Jul. 15, 1997.

(51) Int. Cl.
*H04L 27/28* (2006.01)
*H04K 1/10* (2006.01)
*H04J 13/02* (2006.01)

(52) U.S. Cl. .................. 375/260; 375/146; 370/209

(58) Field of Classification Search .............. 375/130, 375/135, 140, 141, 146, 260, 262, 265, 267; 370/208, 209, 335, 34, 342
See application file for complete search history.

(56) References Cited

U.S. PATENT DOCUMENTS

| | | | |
|---|---|---|---|
| 4,041,391 A * | 8/1977 | Deerkoski | 375/281 |
| 4,425,642 A | 1/1984 | Moses et al. | |
| 4,901,307 A * | 2/1990 | Gilhousen et al. | 370/320 |
| 5,751,761 A | 5/1998 | Gilhousen | |

(Continued)

FOREIGN PATENT DOCUMENTS

JP            358075935 A  *  5/1983

OTHER PUBLICATIONS

U.S. Appl. No. 10/346,876, filed Jan. 17, 2003, Feng-Wen Sun.

*Primary Examiner*—Young T. Tse

(57) ABSTRACT

A communication system is used to transmit and receive data on a plurality of relatively narrow-band signals and wideband signals. The two signal types share a common electromagnetic spectrum by employing spreading gain and maintaining orthogonality between simultaneously transmitted wideband and narrow-band signals. Signal orthogonality is maintained by selectively choosing orthogonal codes and aligning or spacing a wideband carrier frequency with respect to the narrow-band carrier frequencies in accordance with the ratio of the wideband to the narrow-band chip frequencies. A pilot signal is preferably transmitted contemporaneously with the transmission of the first spread signal, and a control date signal, associated with a plurality of users on the first bandwidth, is transmitted on a common control channel using a single Walsh code that is shared by a plurality of users in a TDMA protocol.

22 Claims, 7 Drawing Sheets

U.S. PATENT DOCUMENTS

| | | | |
|---|---|---|---|
| 5,771,461 A * | 6/1998 | Love et al. | 455/522 |
| 5,930,292 A * | 7/1999 | Willis | 375/150 |
| 5,949,796 A * | 9/1999 | Kumar | 370/529 |
| 6,064,663 A | 5/2000 | Honkasalo et al. | |
| 6,069,880 A | 5/2000 | Owen et al. | |
| 6,088,326 A * | 7/2000 | Lysejko et al. | 370/209 |
| 6,091,788 A * | 7/2000 | Keskitalo et al. | 375/347 |
| 6,108,323 A * | 8/2000 | Gray | 370/335 |
| 6,272,121 B1 * | 8/2001 | Smith et al. | 370/342 |
| 6,373,831 B1 * | 4/2002 | Secord et al. | 370/342 |
| 6,400,679 B1 * | 6/2002 | Suzuki | 370/208 |
| 6,510,147 B1 * | 1/2003 | Sun et al. | 370/335 |
| 6,735,240 B1 | 5/2004 | Kang | |
| 6,826,169 B1 | 11/2004 | Nagatani et al. | |
| 6,975,615 B1 * | 12/2005 | Toskala et al. | 370/342 |

* cited by examiner

METHOD FOR TRANSMITTING WIDEBAND SIGNALS VIA A COMMUNICATION SYSTEM ADAPTED FOR NARROW-BAND SIGNAL TRANSMISSION

RELATED APPLICATIONS

This application is a divisional of prior application Ser. No. 09/104,467 filed Jun. 25, 1998, now U.S. Pat. No. 6,539,050. In addition, this application claims priority from U.S. provisional application Ser. No. 60/050,884 which was filed on Jun. 26, 1997, and from U.S. provisional application Ser. No. 60/052,574 which was filed on Jul. 15, 1997.

TECHNICAL FIELD OF THE INVENTION

The present invention relates generally to radio communication systems, and more particularly to a method for transmitting wideband signals via a communications system adapted for transmitting narrow-band signals.

BACKGROUND OF THE INVENTION

Radio communication systems rely on modulating carrier frequencies in a finite portion of the electromagnetic spectrum to wirelessly transmit and receive signals. Modulation can be performed on the amplitude, frequency, and/or phase of the carrier frequency to separate the signal from unwanted noise. The signals typically convey information such as voice, video, and computer data to and from transceiving devices such as cellular base stations, cellular subscriber units, and personal computers.

The portion of the electromagnetic spectrum occupied by a particular transmission or communication system (i.e. bandwidth) may be wide or narrow. Wideband signals can be used to transmit large amounts of data in a relatively short period of time. For example, large computer data files and real-time video could benefit from a wideband signal. Narrow-band signals can be used to conserve the electromagnetic spectrum when transmitting signals with more modest requirements. For example, base stations and cellular subscriber units in most conventional cellular communication systems transmit and receive voice signals using a relatively narrow-band signal.

The amount of usable electromagnetic spectrum is limited by technology, environment, and cost. Extremely high frequency signals require expensive transceiving equipment. Accordingly, communication systems benefit by sharing desirable frequencies. Well known multiple access techniques, such as code division multiple access (CDMA), time division multiple access (TDMA), and frequency division multiple access (FDMA) can be used by a communication system to share the electromagnetic spectrum available to that system. However, these techniques require the signals to be of substantially the same bandwidth. For example, a cellular base station may transmit to a plurality of cellular subscriber units by dividing a portion of the spectrum (e.g., 869 MHz-894 MHz) into a plurality of relatively narrow-band channels (e.g., 30 kHz). Similarly, a satellite communication system may transmit to a plurality of ground stations by dividing a portion of the spectrum (e.g., 3700 MHz-4200 MHz) into a plurality of relatively wideband channels (e.g., 36 MHz). The narrow-band signals and wideband signals occupy distinct portions of the electromagnetic spectrum in order to avoid interfering with each other.

Prior art approaches to bandwidth utilization suffer from certain drawbacks. For instance, prior art approaches do not allow wideband signals to occupy excess capacity in a narrow band system or narrow-band signals to occupy excess capacity in a wide band system. Further, prior art approaches require new communication systems infrastructure (e.g., base stations) to support new types of signals (i.e., signals using different bandwidths).

SUMMARY OF THE INVENTION

In accordance with a first aspect of the invention, a method of transmitting signals having a first bandwidth via a communication system adapted for communicating signals of a second bandwidth, wherein the second bandwidth is narrower than the first bandwidth, is provided. The method comprises the steps of modulating a first data signal with a particular orthogonal code to produce a first spreaded signal having the first bandwidth and transmitting simultaneously the first spreaded signal and the signals of the second bandwidth so that the first bandwidth overlays the second bandwidth. Preferably, multiple users may share the first bandwidth using a time division multiple access protocol.

In certain embodiments, the method further comprises a step of transmitting a pilot signal during transmission of the first bandwidth signals. Preferably, the pilot signal is terminated approximately when the transmission of the first bandwidth signals are terminated. Further, a step of transmitting control data for the first bandwidth signals on a control channel shared by the first bandwidth users may optionally be performed using a time division multiple access protocol.

In a preferred embodiment, the method further comprises a step of encoding the first bandwidth signals with forward error correction codes. In such an instance, the forward error correction codes may optionally be turbo codes. Preferably, the first bandwidth signals originate at a base station and are addressed to a predefined receiver. Also preferably, the second bandwidth signals comprises voice signals and the receivers of the second bandwidth signals comprise cellular subscriber units.

In accordance with another aspect of the invention, a method of adapting a data transmission rate, in response to a data error rate and a transmitter power level, to increase transmission range is provided. The method comprises the steps of increasing the transmitter power level in response to the data error rate and determining a predefined threshold for the transmitter power level. The method further comprises the step of decreasing the data transmission rate in response to the transmitter power level being substantially equal to the predefined threshold, until a predefined error rate is achieved.

In some embodiments, the predefined threshold is a maximum power level or a predefined percentage of a maximum power level. Preferably, the predefined error rate is adjusted according to a type of data being transmitted. In such an instance, when the type of data being transmitted is substantially encoded voice signals, a first error rate is used and when the type of data being transmitted is substantially computer data, a second error rate is used.

In accordance with yet another aspect of the invention, a method of adapting a data transmission rate, in response to a data error rate and a transmitter power level, to increase data transmission rate is provided. The method comprises the steps of decreasing the transmitter power level in response to the data error rate and determining a predefined threshold for the transmitter power level. The method further comprises the step of increasing the data transmission rate in response to the transmitter power level being substantially equal to the predefined threshold, until a predefined error rate is achieved.

In some embodiments, the predefined threshold is a minimum power level or a predefined percentage of a maximum power level. Preferably, the predefined error rate is adjusted according to a type of data being transmitted. In such an instance, when the type of data being transmitted is substantially encoded voice signals, a first error rate is used and when the type of data being transmitted is substantially computer data, a second error rate is used.

In accordance with still another aspect of the invention, a method of transmitting a message intended for transmission on a first bandwidth via a communication system adapted for communicating signals of a second bandwidth, wherein the second bandwidth is narrower than the first bandwidth is provided. The method comprises the steps of determining a length for the message and determining a predefined threshold for message length. The method further comprises the step of transmitting the message using the first bandwidth signal via an access channel when the length is less than the predefined threshold.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on methods for transmitting wideband signals via a radio communication system adapted for transmitting narrow-band signals, persons of ordinary skill in the art will readily appreciate that the techniques of the present invention are in no way limited to radio communication systems, systems transmitting signals with only two distinct bandwidths, or to systems adapted for transmitting narrow-band signals. On the contrary, any communication system which might benefit from shared access to a plurality of frequencies by two or more transceivers transmitting and/or receiving signals at two or more bandwidths may employ the techniques shown herein. Such systems might include systems employing methods for transmitting narrow-band signals via a radio communication system adapted for transmitting wideband signals. Further, wired systems such as computer networks could employ the techniques provided herein without departing from the scope of the invention.

Figure 1:
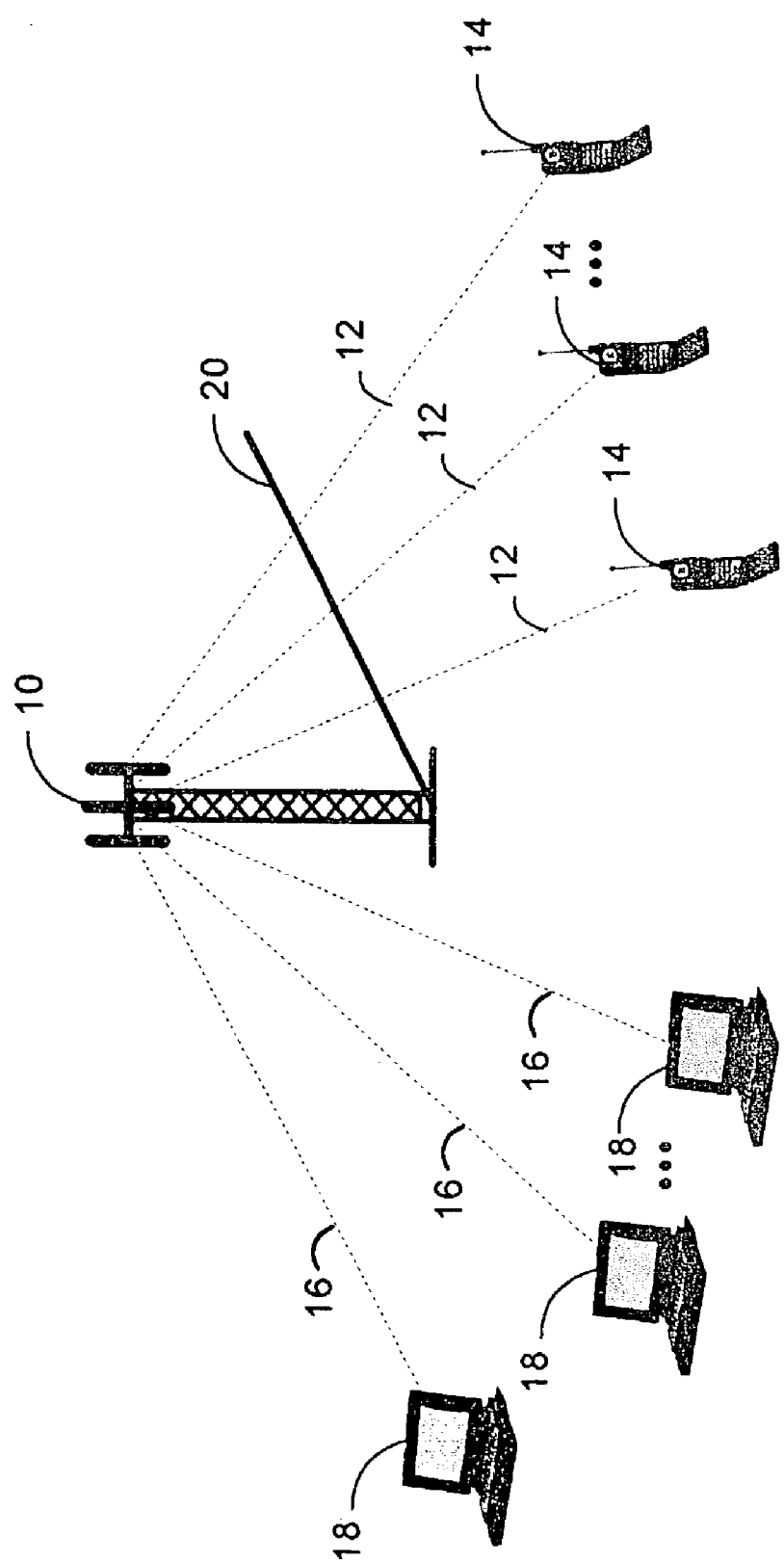
FIG. 1 is a schematic illustration of a communication system capable of utilizing the teachings of the present invention.

A representative communication system capable of utilizing the teachings of the present invention is shown in FIG. 1. A base station 10, such as a cellular communications base station, is used to transmit and receive a plurality of relatively narrow-band signals 12, such as voice signals, to and from a plurality of narrow-band transceivers (transmitter/receiver) 14, such as cellular subscriber units. The base station 10 is typically coupled to a network 20, such as a public switched telephone network (PSTN), the Internet, and/or any other analog or digital network. Radio signals (narrow-band signals 12 and/or wideband signals 16) transmitted to the transceivers (narrow-band transceivers 14 and/or wideband transceivers 18) by the base station 10 could originate from a device connected to the network 20. Similarly, signals 12, 16 transmitted to the base station 10 by the transceivers 14, 18 could be destined for a device connected to the network 20.

The narrow-band signals 12 are transmitted by modulating one or more carrier frequencies 15 (shown in FIGS. 2 and 3) with relatively narrow bandwidths (e.g., 1.25 MHZ as is used for a conventional voice cellular channel) employing code division spread spectrum techniques. The narrow-band signals 12 could be analog voice signals, digitally encoded voice signals, short data messages, and/or any other narrow-band signals or combinations of signals. Cooperation among the narrow-band transceivers 14 to share the available electromagnetic spectrum can be achieved using well known multiple access techniques such as code-division multiple access (CDMA) and frequency-division multiple access (FDMA).

The base station 10 could also be used to transmit and receive a plurality of relatively wideband signals 16, such as data signals, to and from a plurality of wideband transceivers 18, such as computers. The wideband signal(s) 16 are transmitted by modulating a carrier frequency 15 with a relatively wide bandwidth employing code division spread spectrum techniques with higher capacity than the narrow band signals described above (e.g., a bandwidth sufficient for transmitting a data signal such as 3.75 MHz). The wideband signals 16 could be analog video signals, digitally encoded video signals, long data messages, and/or any other wideband signals or combinations of signals. The wideband signals employ CDMA techniques, however, cooperation among the wideband transceivers 18 to share the available electromagnetic spectrum can be achieved using well known multiple access techniques such as time-division multiple access (TDMA). As is known in the art, CDMA techniques spread a signal over a larger bandwidth than that which is required for its transmission. As a result of this spreading gain, a wideband signal (consisting of one or more spreaded signals) may frequency overlay the narrow-band signals described above.

Preferably, the wideband signal 16 is encoded with forward error correction codes such as turbo codes, or any convolutional code. Also preferably, compensation is provided for interference cancellation during reception of the wideband signal 16 where the interference is caused by other wideband transmitters, such as an adjacent cell base station. For example, a well known TDMA protocol could be used within the wideband system. Using a TDMA protocol within the wideband system allows multiple users to share a single code channel, thereby minimizing the number of codes and simplifying interference cancellation. In addition it is preferred that a spread spectrum pilot signal be transmitted using the same carrier during transmission of the wideband signal 16 and terminated approximately when the transmission of the wideband signal is terminated, thus providing coherent detection, but without causing undesireable intracell interference. Further, control data for the wideband signal 16 could be transmitted on the common control channel which utilizes a single Walsh code and is shared by the wideband transceivers 18 in a TDMA protocol.

In conventional wireless communication systems, these two signal types (wideband and narrow-band) would occupy distinct regions of the electromagnetic spectrum to avoid interference. However, in a preferred embodiment of the present invention, the electromagnetic spectrum available to the plurality of narrow-band signals 12 overlays the electromagnetic spectrum available to the wideband signals 16. As a consequence of the well known spreading gain provided by the spread spectrum signals, this overlay is possible. In accordance with the present invention, while the narrow-band signals are transmitted, the wideband signals can share the same spectrum using CDMA techniques generally, and more particularly, by using an orthogonal modulation method that 1) selectively aligns or spaces the narrow band carrier frequency/frequencies with respect to the wideband carrier frequency, 2) spreads wideband signals with orthogonal codes particularly selected to minimize correlation between wideband and narrow-band signals, and 3) spreads the wideband signals by dividing them into a plurality of data streams, spreading the individual data streams, and then recombining the data streams before transmission.

Figure 2:
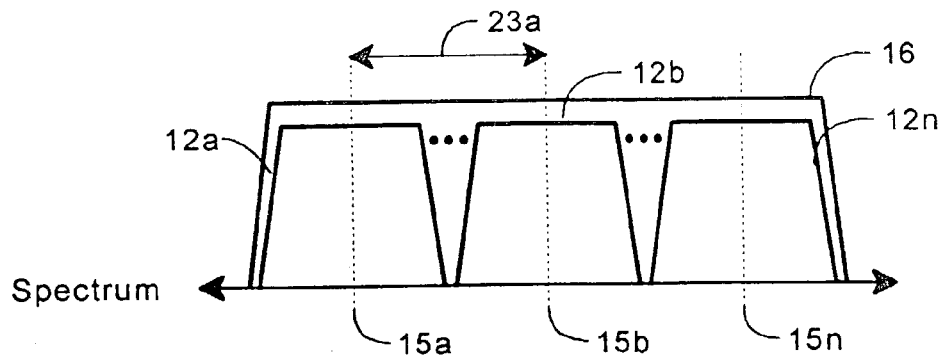
FIG. 2 is a spectral diagram of a wideband signal and narrow-band signals transmitted in accordance with the teachings of the invention.
Figure 3:
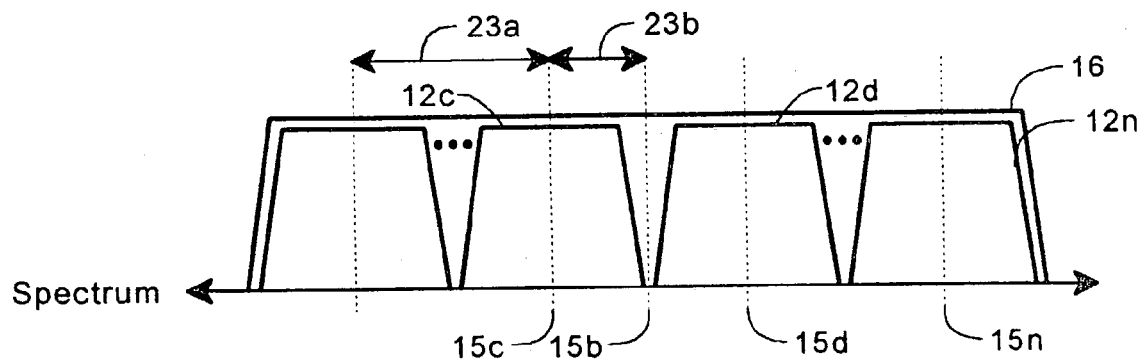
FIG. 3 is a spectral diagram of a wideband signal and narrow-band signals transmitted in accordance with the teachings of the invention.

Illustrated in FIG. 2 and FIG. 3 are spectral diagrams of a wideband signal 16 (i.e., an overlay signal) overlapping a plurality of narrow-band signals 12 (i.e., underlay signals). Although a limited number of signals 12, 16 are shown, any number of narrow-band signals 12 and wideband signals 16 may be accommodated using the teachings of the present invention. Namely, one or many wideband signals 16 may overlay one or many narrow-band signals 12. In FIG. 2, the wideband signal 16 and one of the narrow-band signals 12b use substantially the same carrier frequency 15b. However, another narrow-band signal 12a uses a different carrier frequency 15a separated by an offset 23a. In FIG. 3, the wideband signal 16 uses one carrier frequency 15b and a narrow-band signal 12c uses a different carrier frequency 15c separated by a different offset 23b. In a typical CDMA communication system orthogonal codes (e.g., Walsh codes) are used to spread a data stream and differentiate transmissions. In an alternate embodiment, by systematically selecting the orthogonal codes and the carrier frequencies 15 used by base stations 10 and transceivers 14, 18 in a CDMA system, wideband signals 16 can be transmitted substantially simultaneously with narrow-band signals 12.

Typically, each user is assigned one or more orthogonal codes from a set of mutually orthogonal codes (e.g., Walsh codes) during the setup of a call. Each input data stream is mapped to an orthogonal code (e.g., a logical one maps to the orthogonal code itself and logical zero maps to its binary complement or vice versa). The set of Walsh codes can be generated using Hadamard matrix. A Hadamard matrix of order n can be defined recursively as:

$$W_{2n} = \begin{bmatrix} W_n & W_n \\ W_n & \overline{W_n} \end{bmatrix}$$

Where $W_1$ is defined as $W_1 = [0]$ and $\overline{W_1}$ is the binary complement of $W_1$. A Walsh code of length $2n$ corresponds to a row of the matrix $W_{2n}$.

Figure 4:
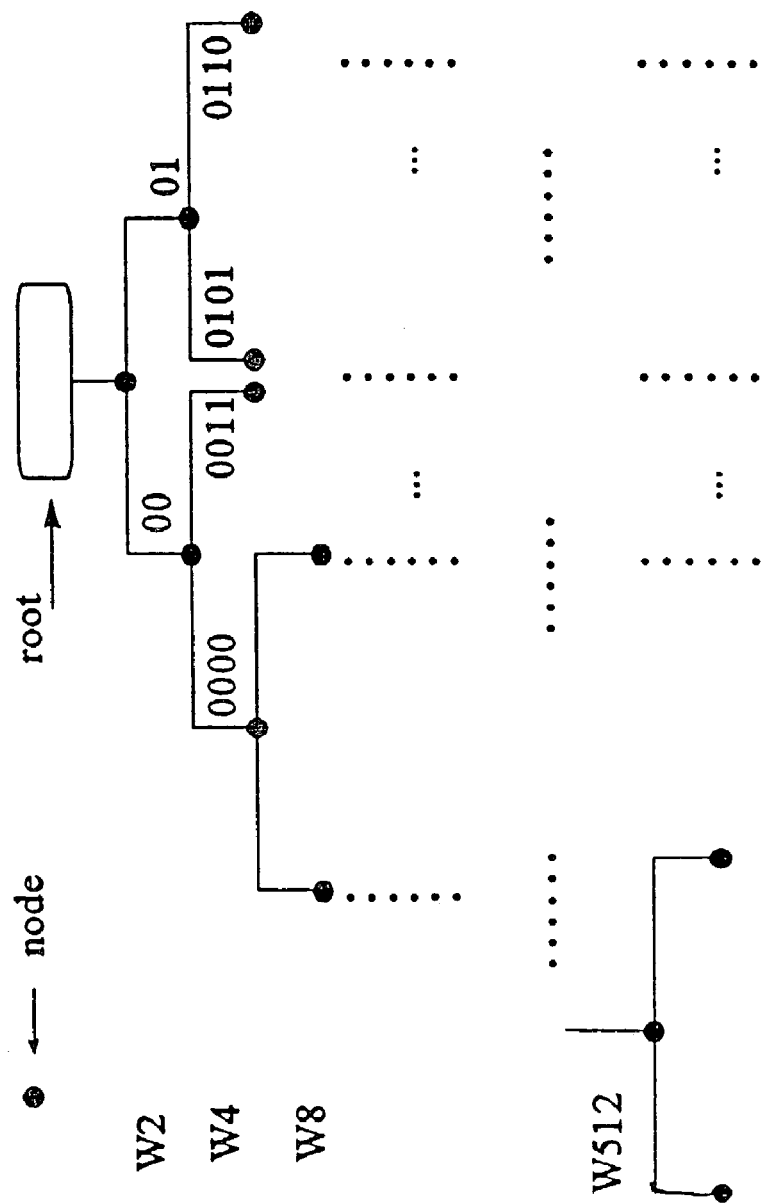
FIG. 4 is a diagram of Walsh tree.

An alternative way to describe the Walsh codes is illustrated in FIG. 4. The unique Walsh code of length one sits at the root of the tree. Each node of the tree represents a valid Walsh code. The two nodes at the second level represents the two Walsh codes of length 2, etc. Nodes at the same level represents the Walsh codes of the same length. For any given two Walsh codes (two nodes in the tree, not necessarily at the same level), we can trace the tree toward the root until the traced back path first meets at a node. This common node along the traced back paths of two different Walsh codes is defined as the first common node. Note that the Walsh code represented by the first common node of two Walsh codes is the prefix of both Walsh codes and it is the largest common prefix.

Figure 5:
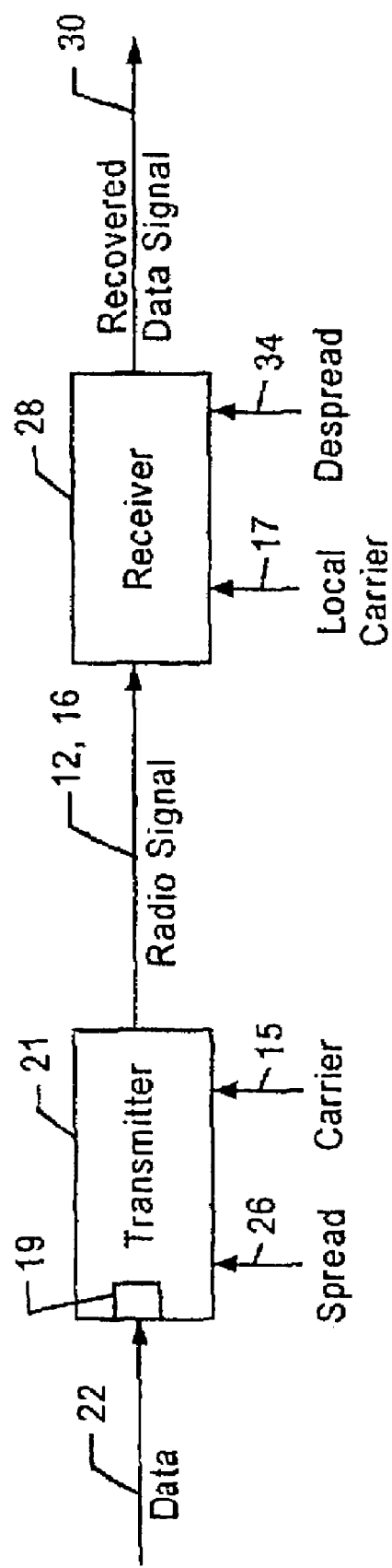
FIG. 5 is a block diagram of a typical code-division multiple access transmitter and receiver.

A typical CDMA communication system is shown in FIG. 5. A transmitter 21 (one or more of which is integral to the base station 10 and/or transceivers 14, 18) spreads 26 a data signal 22, representing a message to be sent, and mixes the result with a carrier frequency 15 to produce a radio signal (narrow-band signal 12 or wideband signal 16). The radio signal 12, 16 is captured by a receiver 28 (integral to the base station 10 and/or transceivers 14, 18) which recovers an estimate 30 of the data signal 22 by mixing the radio signal 12, 16 with a local carrier frequency 17 which downconverts the radio signal to an intermediate frequency or baseband and despreading 34 the signal.

Figure 6:
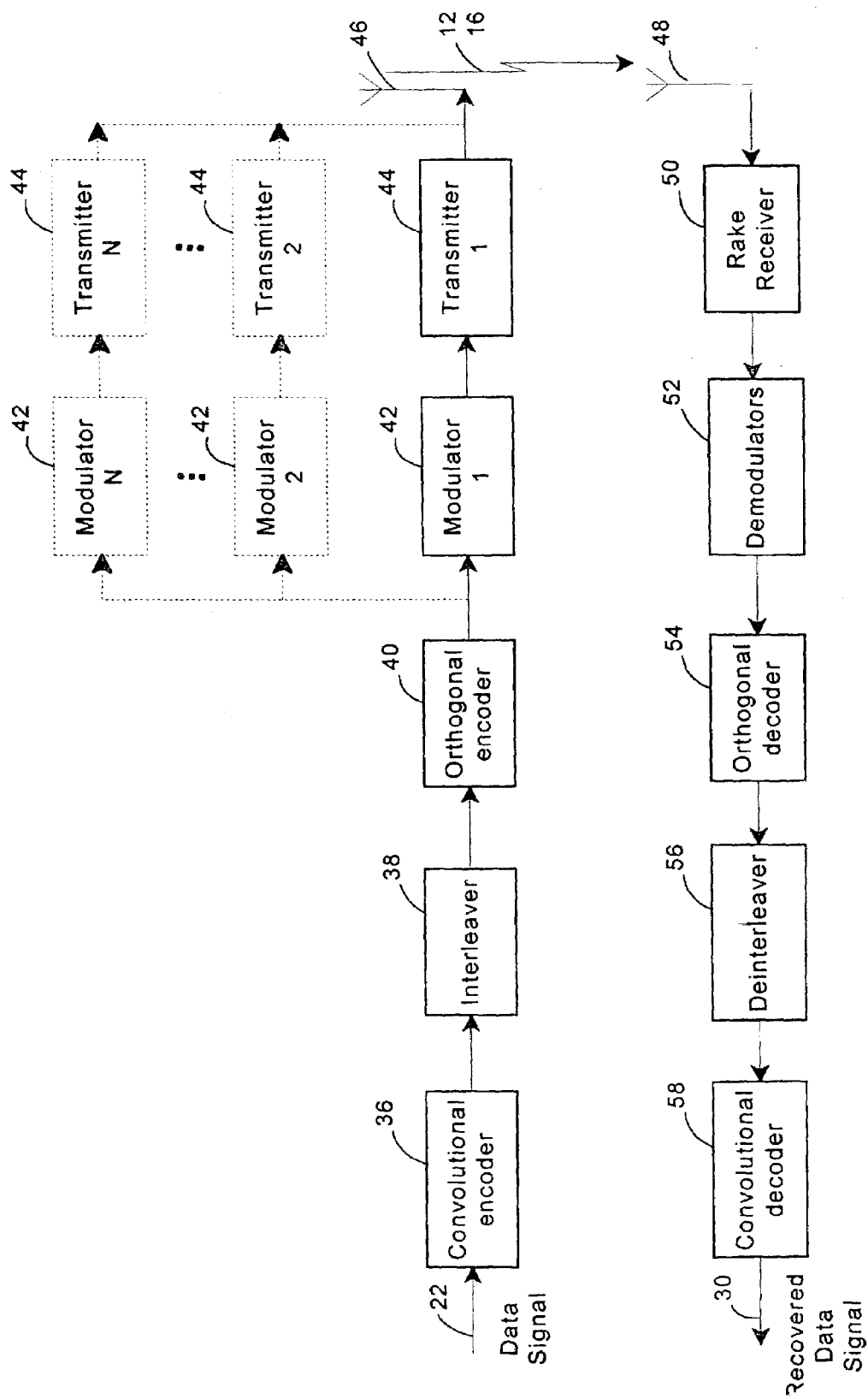
FIG. 6 is a more detailed diagram of the transmitter and receiver of FIG. 3.

A more detailed diagram of the transmitter/spreader 21 and receiver/despreader 28 of FIG. 5 is shown in FIG. 6. The data signal 22 to be transmitted is preferably encoded with a forward error correction code by a conventional convolutional encoder 36, typically comprising shift registers and modulo-2 adders. Since convolutional encoding only works most efficiently on random (non-consecutive) errors, and since burst errors are common in wireless environments, the encoded signal is typically interleaved by an interleaver 38. The interleaver 38 shuffles the bits into a random sequence, thus making burst errors appear to be random errors after deinterleaving.

The interleaved data stream is split into a plurality of paths, for example, if three narrow-band underlay signals are expected then the interleaved data stream is split into three parallel streams as shown in FIG. 6. Each data stream is spread by a Walsh code the prefix of this orthogonal Walsh code being used is preferably different from all other orthogonal codes currently being used to encode transmitted signals in the same geographical area and frequency band used by the underlay narrow-band signals. The multiple outputs of the Walsh modulator are serially combined and ultimately transmitted as a single wideband overlay signal.

A more detailed diagram of the transmitter 21 and receiver 28 of FIG. 5 is shown in FIG. 6. The data signal 22 to be transmitted is preferably wrapped around a forward error correction code by a conventional convolutional encoder 36, typically comprising shift registers and modulo-2 adders. As is well known in the art, the adders create check digits that are a function of a particular subset of the data signal to be transmitted as it is passed through the shift registers. Since convolutional encoding works most effectively on random (non-consecutive) errors, and since burst errors are common in wireless environments, the encoded signal is typically interleaved by an interleaver 38. The interleaver 38 shuffles the bits into a random sequence, thus making burst errors appear to be random errors after deinterleaving.

In an exemplary embodiment, the interleaved code is then divided into short bit sequences (e.g., six bits), each of which is mapped to an orthogonal code (e.g., a 64 bit Walsh code) by an orthogonal encoder 40. The orthogonal codes may then be sent to a modulator 42 and a transmitter 44 for communication from a transmitting antenna 46 to a receiving antenna 48.

The receiving antenna 48 is preferably coupled to a rake receiver 50 and demodulators 52 to capture the radio signal 12 in a known manner. An orthogonal decoder 54 may be used to recover the radio signal 12. Once recovered, the data is typically restored to its original sequence by a deinterleaver 56 and the forward error correction code may be removed by a convolutional decoder 58.

If more than one carrier frequency 15 is used by the narrow-band underlay, each is preferably separated by an offset 23 substantially equal to an integer multiple of the narrow-band signal's 12 chip rate. For example, if three narrow-band signals 12 and one wideband signal 16 are transmitted simultaneously (see FIG. 2), the wideband signal 16 and the first narrow-band signal 12b could be transmitted at a first carrier frequency 15b. The second narrow-band signal 12a could be transmitted at a second carrier frequency 15a offset 23a below the first carrier frequency 15b by an amount substantially equal to the narrow-band signals' 12 chip rate. Similarly, the third narrow-band signal 12n could be transmitted at a third carrier frequency 15n offset above the first carrier frequency 15b by an amount substantially equal to the narrow-band signals' 12 chip rate.

In yet another alternative, each underlay narrow-band carrier frequency 15 is preferably separated by an offset 23 substantially equal to an odd multiple of one half the chip rate of the narrow-band signal 12. For example, if two narrow-band signals 12 and one wideband signal 16 are transmitted simultaneously (see FIG. 3), the wideband signal 16 could be transmitted at a first carrier frequency 15b. The first narrow-band signal 12c could be transmitted at a second carrier frequency 15c offset below the first carrier frequency 15b by an amount substantially equal to one half the narrow-band signals' 12 chip rate. Similarly, the second narrow-band signal 12d could be transmitted at a third carrier frequency 15d offset above the first carrier frequency 15b by an amount substantially equal to one half the narrow-band signals' 12 chip rate.

In a further embodiment of the present invention, the length of a message intended for transmission by a wideband transceivers 18 using the wideband signal 16 is compared with a predefined threshold for message length. If the length of the message to be transmitted is below the threshold, the message is transmitted using the common access channel which is shared by the users of the wideband signal.

Figure 7:
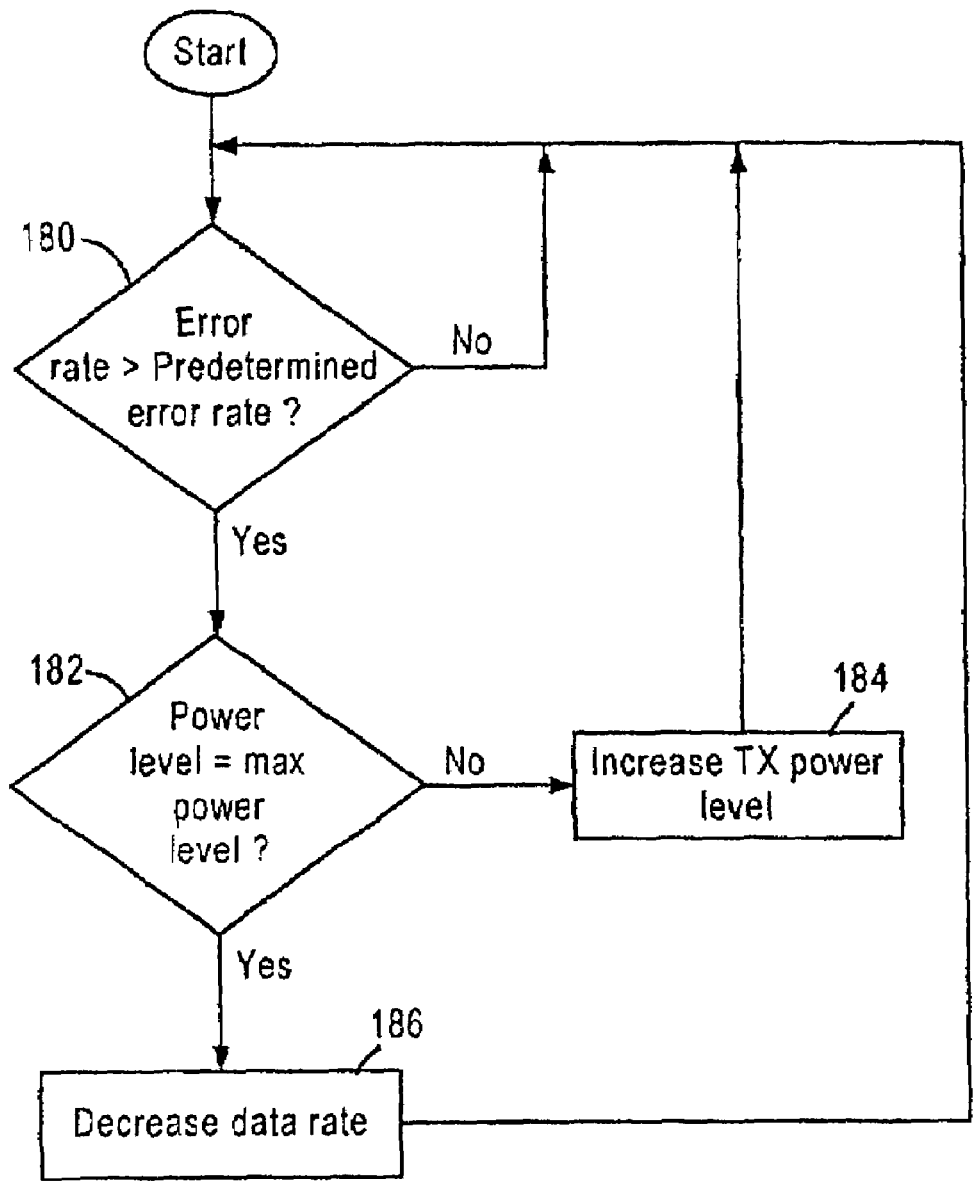
FIG. 7 is a flow chart of a program that can be implemented by the transceivers of FIG. 1 to increase transmission range; and, FIG. 8 is a flow chart of a program that can be implemented by the transceivers of FIG. 1 to increase data transmission rate.

In another embodiment of the present invention, the range at which the transceivers 14, 18 are able to transmit signals 12, 16 is increased. FIG. 7 illustrates a flow chart of a program that can be implemented by the transceivers 14, 18 to increase transmission range. The programmed steps are performed by a control circuit such as a microprocessor or application specific integrated circuit (ASIC) as is conventional. Once the program is initiated by a transceiver 14, 18 (e.g., a cellular subscriber unit is turned on or a computer needs to transmit data), the control circuit determines if the current error rate is greater than a predetermined error rate (block 180). The predetermined error rate could vary based on the type of data being transmitted. For example, voice signals may tolerate errors more readily than computer data and may therefore be transmitted with a higher error rate. If the current error rate is not greater than the predetermined error rate, the control circuit continues to monitor the error rate as long as the program is executing (block 180). However, if the current error rate is greater than the predetermined error rate, the control circuit determines if the current transmitter power level is substantially equal to a predefined threshold for the transmitter power level (block 182). The predefined threshold for the transmitter power level could be a maximum power level or a predefined percentage of a maximum power level (e.g., the most power allowed by a standard or regulation or the most power the transceiver can produce based on design constraints or current battery level). If the current transmitter power level is not substantially equal to the predefined threshold for the transmitter power level, the control circuit increases the transmitter power level (block 184). However, if the current transmitter power level is substantially equal to the predefined threshold for the transmitter power level, the control circuit decreases the data transmission rate (block 186). By adapting the data transmission rate, in response to the data error rate and transmitter power level, the transmission range can be increased.

Figure 8:
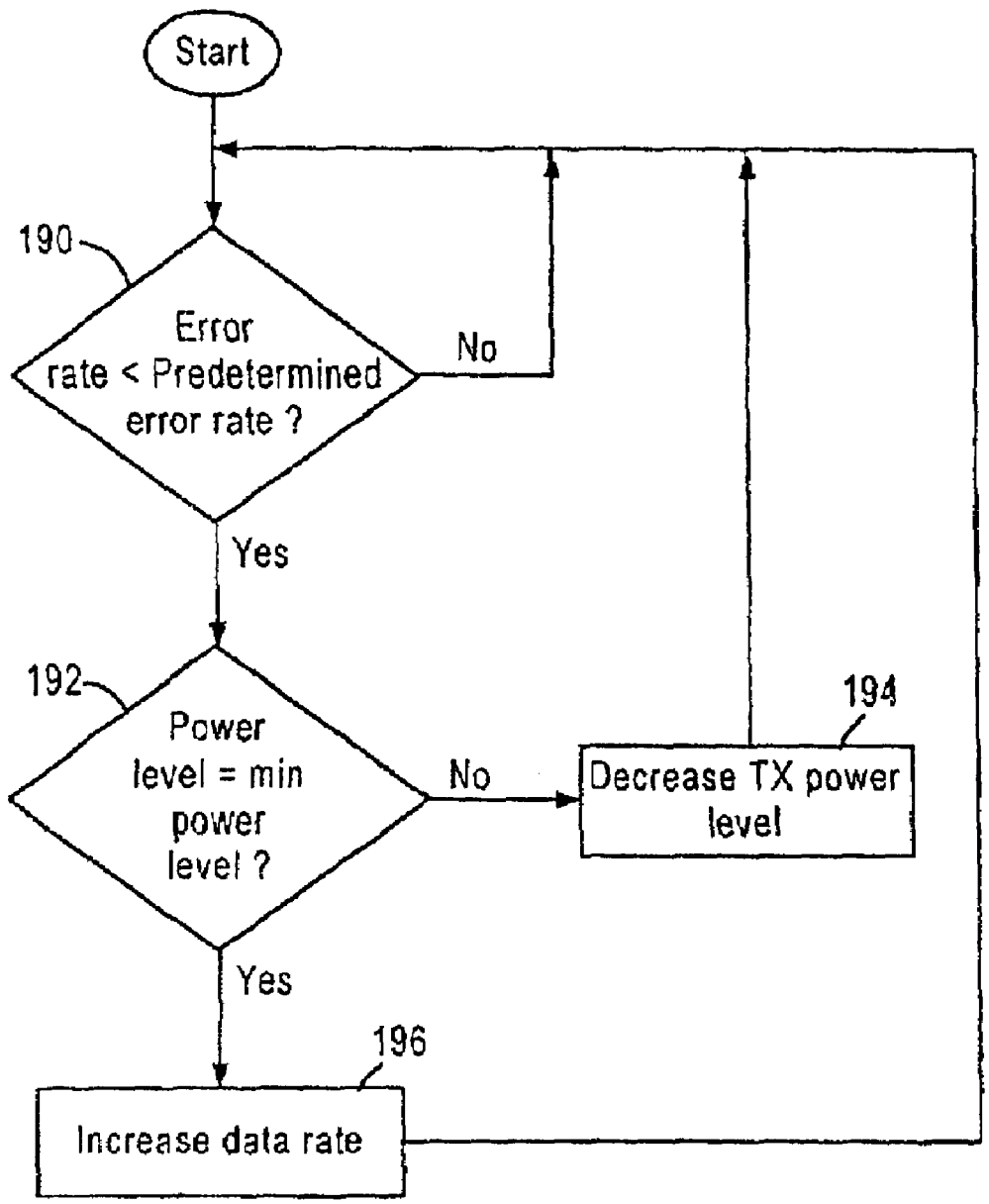

In yet another embodiment of the present invention, the data transmission rate at which the transceivers 14, 18 are able to transmit signals 12, 16 is increased. FIG. 8 illustrates a flow chart of a program that can be implemented by the transceivers 14, 18 to increase the data transmission rate. The programmed steps are performed by a control circuit such as a microprocessor or application specific integrated circuit (ASIC) as is conventional. Once the program is initiated by transceiver 14, 18 (e.g., a cellular subscriber unit is turned on or a computer needs to transmit date), the control circuit determines if the current error rate is less than a predetermined error rate (block 190). Again, the predetermined error rate could vary based on the type of data being transmitted. If the current error rate is not less than the predetermined error rate, the control circuit continues to monitor the error rate as long as the program is executing (block 190). However, if the current error rate is less than the predetermined error rate, the control circuit determines if the current transmitter power level is substantially equal to a predefined threshold for the transmitter power level (block 192). The predefined threshold for the transmitter power level could be a minimum power level or a predefined percentage of a maximum power level. If the current transmitter power level is not substantially equal to the predefined threshold for the transmitter power level, the control circuit decreases the transmitter power level (block 194). However, if the current transmitter power level is substantially equal to the predefined threshold for the transmitter power level, the control circuit increases the data transmission rate (block 196). By adapting the data transmission rate, in response to the data error rate and transmitter power level, the data transmission rate can be increased.

In summary, persons of ordinary skill in the art will readily appreciate that a method for transmitting wideband signals via a communications system adapted for transmitting narrow-band signals has been provided. Systems and apparatus implementing the teachings of the invention can enjoy increased efficiency in bandwidth utilization.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of transmitting a first spread signal having a first bandwidth via a communication system adapted for communicating a second signal of a second bandwidth, the second bandwidth being narrower than the first bandwidth, the method comprising:

modulating a first data signal with a first code to produce the first spread signal having the first bandwidth so that the first spread signal is orthogonal to the second signal of the second bandwidth;

transmitting the first spread signal and the second signal simultaneously so that the first bandwidth overlays the second bandwidth;

transmitting a pilot signal contemporaneously with transmission of the first spread signal; and transmitting a control data signal, associated with a plurality of users on the first bandwidth, on a common control channel using a single Walsh code that is shared by a plurality of users in a TDMA (Time Division Multiple Access) protocol.

2. The method of claim 1, wherein the first code is associated with turbo coding.

3. The method of claim 1, wherein the modulating step is associated with a CDMA protocol.

4. The method of claim 1, wherein the first code is a Walsh code.

5. A method of transmitting a first spread signal having a first bandwidth via a communication system adapted for communicating a second signal of a second bandwidth, the second bandwidth being narrower than the first bandwidth, the method comprising:

modulating a first data signal with a first code to produce the first spread signal having the first bandwidth so that the first spread signal is orthogonal to the second signal of the second bandwidth;

transmitting the first spread signal and the second signal simultaneously so that the first bandwidth overlays the second bandwidth; and adaptively varying a data transmission rate associated with the first spread signal in response to a transmitter power level and a data error rate.

6. A method of transmitting a first spread signal having a first bandwidth via a communication system adapted for communicating a second signal of a second bandwidth, the second bandwidth being narrower than the first bandwidth, the method comprising:

modulating a first data signal with a first code to produce the first spread signal having the first bandwidth so that the first spread signal is orthogonal to the second signal of the second bandwidth;

transmitting the first spread signal and the second signal simultaneously so that the first bandwidth overlays the second bandwidth; and comparing a message length to a predetermined threshold for message length, and transmitting the message using the spread spectrum access channel of the first bandwidth when the message length is less than the predetermined threshold.

7. A method of transmitting a first spread signal having a first bandwidth via a communication system adapted for communicating a second signal of a second bandwidth, the second bandwidth being narrower than the first bandwidth, the method comprising:

modulating a first data signal with a first code to produce the first spread signal having the first bandwidth so that the first spread signal is orthogonal to the second signal of the second bandwidth;

transmitting the first spread signal and the second signal simultaneously so that the first bandwidth overlays the second bandwidth; and transmitting a pilot signal contemporaneously with transmission of the first spread signal, wherein a first carrier frequency associated with the first spread signal having a first chip rate has a spacing with respect to a second carrier frequency associated with the second signal having a second chip rate, the spacing being either an integer multiple of the ratio of the first chip rate to the second chip rate, or an odd multiple of one-half the ratio of the first chip rate to the second chip rate.

8. A method for transmitting data, comprising:

encoding a first data stream using a first code to produce a first encoded data stream; modulating the first encoded data stream to produce a first data signal having a first bandwidth in a frequency spectrum;

encoding a second data stream using a spreading code to produce a spread signal, the spread signal having a second bandwidth in the frequency spectrum, wherein the spreading code is orthogonal to the first code;

encoding a third data stream using a third code to produce a third encoded data stream;

modulating the third encoded data stream to produce a third data signal having the first bandwidth in the frequency spectrum, wherein the spreading code is orthogonal to the third code; and simultaneously transmitting the first data signal and the spread signal, wherein the spread signal overlays the first data signal in the frequency spectrum.

9. The method of claim 8, wherein the first and third data signals represent narrow-band signals, the method further comprising:

separating first carrier frequencies associated with the narrow-band signals from a second carrier frequency associated with the spread signal by a frequency value based on a chip rate of the narrow-band signals.

10. The method of claim 9, wherein the separating comprises:

separating the first carrier frequencies of the narrow-band signals from the second carrier frequency by a frequency value equal to an integer multiple of the chip rate associated with the narrow-band signals.

11. The method of claim 9, wherein the separating comprises:

separating the first carrier frequencies of the narrow-band signals from the second carrier frequency by a frequency value equal to an odd multiple of one half the chip rate of the narrow-band signals.

12. The method of claim 8, wherein the first code and the spreading code comprise Walsh codes.

13. The method of claim 8, wherein the spread signal comprises time division multiplexed information.

14. A system for transmitting data, comprising:

an encoder configured to encode a first data stream using at least one code to produce at least one encoded data stream;

a modulator configured to modulate the at least one encoded data stream to produce a first signal having a first bandwidth; and a transmitter configured to simultaneously transmit the first signal and a plurality of second signals, wherein the first signal overlays the plurality of second signals in a frequency spectrum and the first signal is orthogonal to each of the plurality of second signals.

15. The system of claim 14, wherein the first signal represents a wideband signal and the plurality of second signals represent narrow-band signals, wherein carrier frequencies associated with the narrow-band signals are separated from a first carrier frequency associated with the wideband signal by a frequency value based on a chip rate of the narrow-band signals.

16. The system of claim 15, wherein the carrier frequencies associated with the narrow-band signals are separated from the first carrier frequency by a frequency value equal to an integer multiple of the chip rate associated with the narrow-band signals.

17. The system of claim 15, wherein the carrier frequencies associated with the narrow-band signals are separated from the first carrier frequency by a frequency value equal to an odd multiple of one half the chip rate of the narrow-band signals.

18. The system of claim 14, wherein the at least one code comprises at least one Walsh code.

19. A method for transmitting data, comprising:
   encoding a first data stream using at least one Walsh code to produce a first encoded data stream;
   modulating the first encoded data stream to produce a first data signal having a first bandwidth in a frequency spectrum; and
   simultaneously transmitting the first data signal with a plurality of second signals, the plurality of second signals representing narrow-band signals, wherein the first data signal overlays the plurality of second signals in the frequency spectrum and is orthogonal to each of the plurality of second signals.

20. The method of claim 19, further comprising:
   separating the narrow-band signals from a first carrier frequency associated with the first data signal by a frequency value based on a chip rate of the narrow-band signals; and
   modulating the narrow-band signals with carrier signals based on the separating.

21. The method of claim 20, wherein the separating comprises:
   separating the narrow-band signals from the first carrier frequency by a frequency value approximately equal to an integer multiple of the chip rate associated with the narrow-band signals.

22. The method of claim 20, wherein the separating comprises:
   separating the narrow-band signals from the first carrier frequency by a frequency value approximately equal to an odd multiple of one half the chip rate of the narrow-band signals.

* * * * *